United States Patent [19]

Jordan et al.

[11] Patent Number: 5,215,317
[45] Date of Patent: Jun. 1, 1993

[54] KEYLESS CHUCK

[75] Inventors: Paul T. Jordan, Roscoe, Ill.; Louis M. Shadeck, Anderson; Robert O. Huff, Piedmont, both of S.C.

[73] Assignee: Jacobs Chuck Technology Corp., Wilmington, Del.

[21] Appl. No.: 884,362

[22] Filed: May 18, 1992

[51] Int. Cl.⁵ ............................................. B23B 31/12
[52] U.S. Cl. ....................................... 279/63; 279/140; 279/902
[58] Field of Search ................................ 279/60-65, 279/902, 140

[56] References Cited

U.S. PATENT DOCUMENTS

| | | | |
|---|---|---|---|
| 573,189 | 12/1896 | Vogel | 279/62 |
| 962,746 | 6/1910 | Cogswell | 279/62 |
| 1,159,344 | 11/1915 | Van Ness | 279/62 |
| 1,473,488 | 11/1923 | McConnell | 279/62 |
| 1,476,903 | 12/1923 | McConnell | 279/62 |
| 1,513,332 | 10/1924 | McConnell | 279/62 |
| 1,705,275 | 3/1929 | Neudeck | 279/64 |
| 2,292,470 | 8/1942 | Ostberg | 279/60 |
| 2,458,626 | 1/1949 | Norige | 279/64 |
| 2,553,990 | 5/1951 | Vidal | 279/56 |
| 3,311,384 | 3/1967 | Kawasaki | 279/62 |
| 3,807,745 | 4/1974 | Bent | 279/60 |
| 4,305,597 | 12/1981 | McCarty | 279/22 |
| 4,423,881 | 1/1984 | Whitehead | 279/62 |
| 4,527,809 | 7/1985 | Umbert | 279/64 |
| 4,695,065 | 9/1987 | Komatsu et al. | 279/60 |
| 4,836,563 | 6/1989 | Rohm | 279/63 |
| 4,842,288 | 6/1989 | Ando | 279/62 |
| 4,902,025 | 2/1990 | Zimdars | 279/64 |
| 4,930,793 | 6/1990 | Ando | 279/61 |
| 4,951,955 | 8/1990 | Sakamaki | 279/62 |
| 4,958,840 | 9/1990 | Palm | 279/62 |
| 5,009,439 | 4/1991 | Sakamaki | 279/62 |
| 5,031,925 | 7/1991 | Tatsu et al. | 279/64 |
| 5,044,643 | 9/1991 | Nakamura | 279/60 |

Primary Examiner—Steven C. Bishop
Attorney, Agent, or Firm—Robert R. Jackson; G. Victor Treyz

[57] ABSTRACT

A chuck has a spring connection between the nut which rotates to advance or retract the jaws and the control ring or sleeve which the user rotates to operate the chuck. The spring normally transmits tightening or loosening rotation from the sleeve to the nut. When the jaws contact a tool, however, the spring allows the sleeve to continue to rotate even though the nut is stopped by the jaw-tool contact. Continued rotation of the sleeve relative to the nut causes a cam mechanism interposed between these two elements to force the non-rotating nut axially forward. This applies a final tool-gripping force to the jaws.

15 Claims, 3 Drawing Sheets

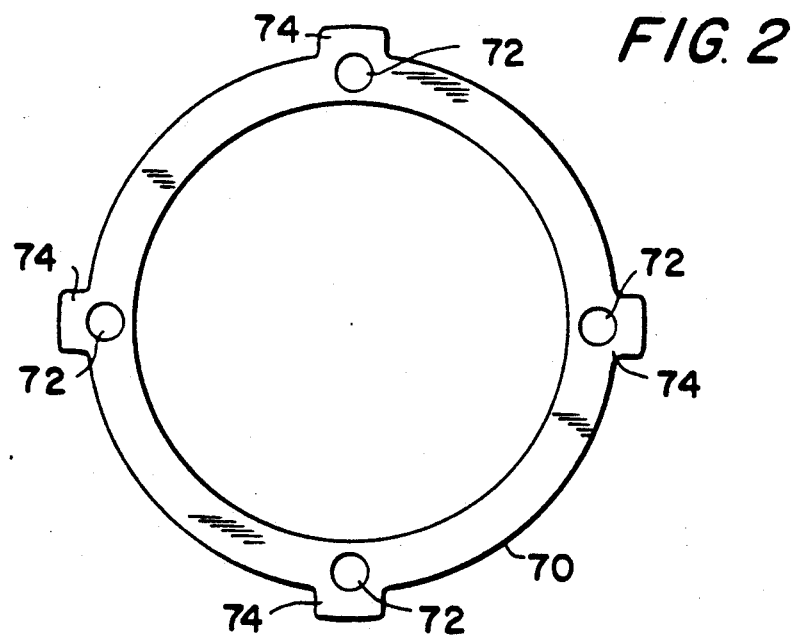
FIG. 2
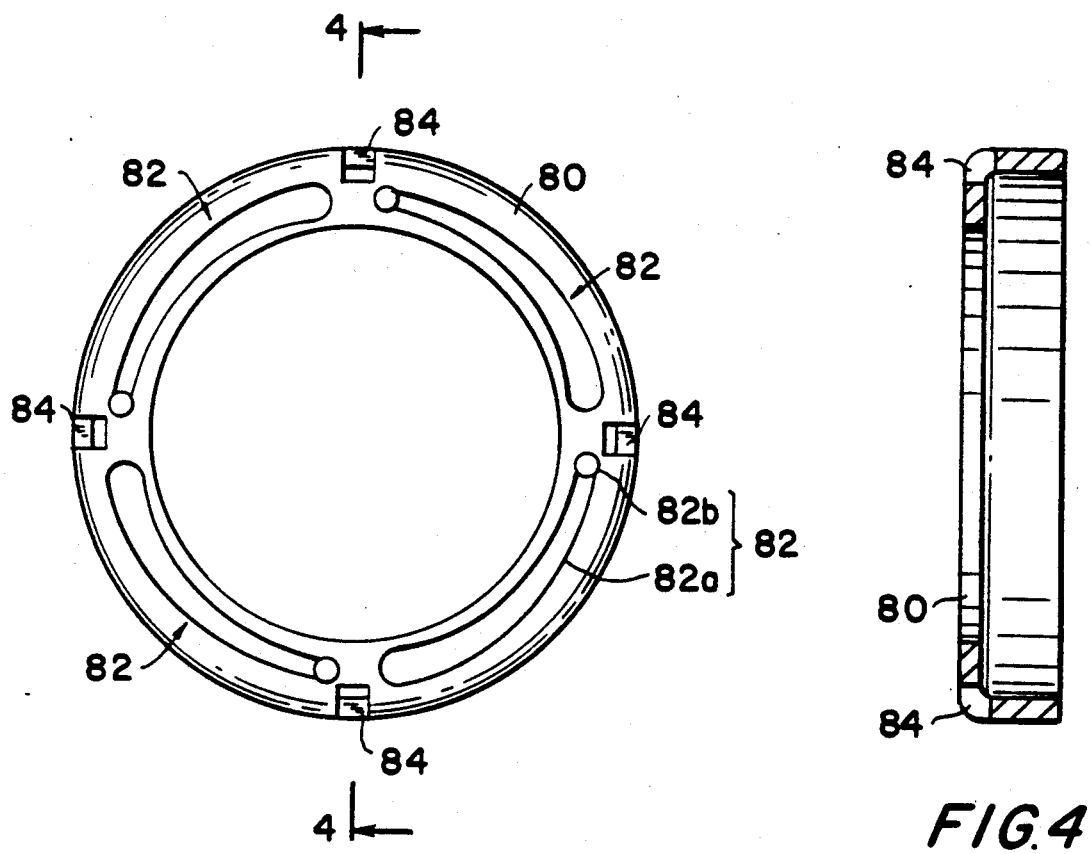
FIG. 3
FIG. 4

KEYLESS CHUCK

BACKGROUND OF THE INVENTION

This invention relates to chucks for releasably gripping tools such as drill bits in electric drills.

Many workers in the chuck art have attempted to devise chucks which can be manually tightened on a tool without the need for a separate element such as a key for providing the final tightening action. It is desirable for a chuck to have relatively rapidly moving jaws so that the user does not have to spend a long time rotating the sleeve or other control element which moves the jaws when the chuck must be adjusted to grip tools of different sizes. On the other hand, rapid movement of the jaws typically requires relatively coarse threads in the chuck. Coarse threads decrease mechanical advantage and make it more difficult for the user to tighten the chuck securely on a tool without the provision of some additional tightening element such as a key. While many chucks have keys, they do present some problems For example, they are easily lost, they may be a safety concern (because the key must be removed from the chuck before the tool can be safely used), and they slow down use of the chuck (because they are a separate element which must be fitted into the chuck, operated to tighten the chuck, and then removed from the chuck).

Thus, as noted above, many prior workers have attempted to provide chucks which can be manually tightened on a tool without the need for a key or extremely fine jaw threads which may annoy some users because of the resulting slow motion of the jaws. However, the known prior attempts in this regard have all had significant disadvantages. Some of these prior keyless chucks have required large numbers of additional component parts, which substantially increases manufacturing cost. Some have been more complicated to operate (e.g., because the user must switch from one control element for coarse adjustment of the jaws to another control element for fine adjustment or locking and unlocking of the jaws). Still other prior art keyless chucks have been relatively unreliable (e.g., because the final tightening elements in them are not sufficiently positively controlled during tightening or resetting of the mechanism).

In view of the foregoing, it is an object of this invention to improve and simplify keyless chucks.

It is a more particular object of this invention to provide keyless chucks which do not require large numbers of additional components to provide a tight grip on a tool.

It is another more particular object of this invention to provide keyless chucks which are highly reliable in operation because the operative elements in the chuck are more positively controlled than in many prior keyless chucks.

It is still another more particular object of this invention to provide keyless chucks which can have relatively coarse threads for rapid jaw movement, but which still provide very firm final gripping of a tool.

SUMMARY OF THE INVENTION

These and other objects of the invention are accomplished in accordance with the principles of the invention by providing a chuck in which the control ring or sleeve which controls motion of the jaws is coupled to the nut which actually moves the jaws by a spring which is compressible or expandable in the circumferential direction of the chuck. Until the jaws contact a tool, the spring transmits the rotation of the sleeve to the nut to advance (or retract) the jaws. When the jaws contact a tool, however, the spring compresses or expands circumferentially of the chuck, thereby allowing the sleeve to continue to rotate even though the nut has stopped rotating The sleeve is also connected to a cam ring which is spaced from the nut by one or more rolling bearing elements. When the nut stops rotating because the jaws have contacted a tool as described above, the sleeve continues to rotate the cam ring. The rolling bearing elements travel up cam surfaces on the cam ring, thereby forcing the nut forward. This causes the jaws to further tighten on the tool. The rolling bearing elements are preferably circumferentially spaced from one another by being disposed in an annular cage. This cage is preferably coupled to the above-mentioned circumferentially acting spring so that the spring ensures resetting of the cage and the rolling bearing elements each time the chuck is operated to release a tool. If desired, the cam surfaces may have small, final, reverse-inclined portions to provide a detent-type final locking of the grip on the tool.

Further features of the invention, its nature and various advantages will be more apparent from the accompanying drawings and the following detailed description of the preferred embodiments.

BRIEF DESCRIPTION OF THE DRAWINGS

FIG. 2 is an elevational view of one component of the chuck of FIG. 1.

FIG. 3 is an elevational view of another component of the chuck of FIG. 1.

FIG. 4 is a sectional view taken along the line 4—4 in FIG. 3.

DETAILED DESCRIPTION OF THE PREFERRED EMBODIMENTS

Figure 1:
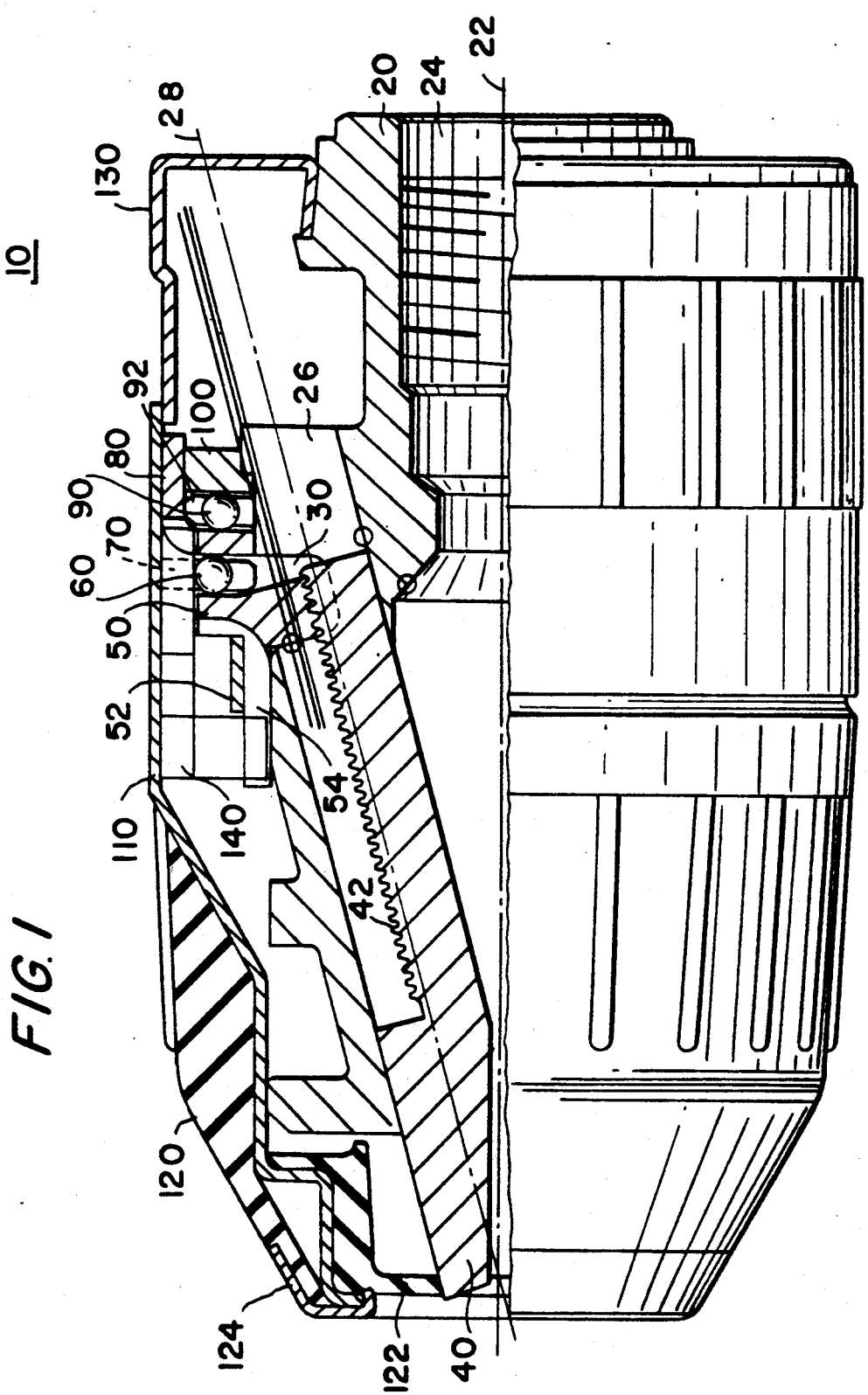
FIG. 1 is an elevational view, partly in section, of an illustrative embodiment of a chuck constructed in accordance with the principles of this invention.

As shown in FIG. 1, an illustrative embodiment of a chuck 10 constructed in accordance with the principles of this invention includes a main body 20 having a central longitudinal axis 22 and a central longitudinal bore 24 concentric with axis 22. Circumferentially spaced around bore 24 are three other bores 26 (only one of which is visible in FIG. 1) which are all inclined toward one another and which communicate with the distal portion of bore 24. A jaw 40 is disposed in each bore 26 for reciprocal motion along the longitudinal axis 28 of the associated bore 26. The radially outer surface of the rear of each jaw 40 is threaded as indicated by the reference number 42 for engagement with threads on the interior of annular nut 50. Nut 50 is rotatable in an annular recess 30 in main body 20. To facilitate assembly, nut 50 may be made up of two or more arcuate segments held together by annular steel band 52.

Immediately behind a radially outer portion of nut 50 is a plurality of rolling bearing elements 60 (in this case balls) circumferentially spaced from one another in circumferentially spaced apertures 72 in annular cage 70

(see also FIG. 2). In the particular embodiment shown in the drawings, there are four balls 60, but it will be understood that a greater or lesser number of such elements can be used if desired. Except to the extent that cage 70 is constrained as described below, cage 70 and balls 60 are rotatable about axis 22 relative to the other elements of the chuck.

Behind balls 60 is an annular cam ring 80 (see also FIGS. 3 and 4). Like nut 50 and cage 70, cam ring 80 is rotatable about main body 20. As can be seen in FIG. 3, cam ring 80 has four circumferentially spaced, arcuate cam surfaces 82 on its side facing balls 60. Balls 60 are radially located and circumferentially spaced so that one ball 60 bears on each of cam surfaces 82. Each of cam surfaces 82 has an initial portion 82a which progresses in the counterclockwise direction (as viewed in FIG. 3) from being relatively deeply recessed in cam ring 80 to being relatively less deeply recessed in the cam ring. A final portion 82b of each cam surface 82 continues a short distance in the counterclockwise direction with a small reverse incline (i.e., each final portion 82b becomes slightly more recessed in cam ring 80 in the counterclockwise direction).

Behind cam ring 80 are more rolling bearing elements 90 (again in this case balls) circumferentially spaced from one another in apertures in an annular cage 92.

Behind balls 90 is an annular bearing washer 100. Washer 100 transmits rearwardly directed thrust from elements 40, 50, 60, 80, and 90 to main body 20.

An annular front sleeve 110 is mounted outside body 20 and cam ring 80. Front sleeve 110 is rotatable relative to body 20, but is not rotatable relative to cam ring 80. Front sleeve 110 is partly covered by annular rubber grip boot 120 to facilitate manual rotation of sleeve 110. Inside the distal end of sleeve 110 is an annular rubber diaphragm 122 for centering a tool in chuck 10 prior to tightening of jaws 40 and for helping to keep foreign objects out of the chuck, especially during use of a tool gripped in the chuck. The extreme distal end of boot 120 is protected by an annular metal collar 124. An annular rear sleeve 130 is fixed to the rear of main body 20. The chuck is typically operated by rotating front sleeve 110 relative to rear sleeve 130.

Figure 5:
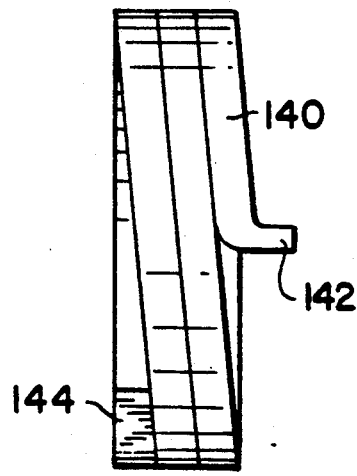
FIG. 5 is an elevational view of still another component of the chuck of FIG. 1.
Figure 6:
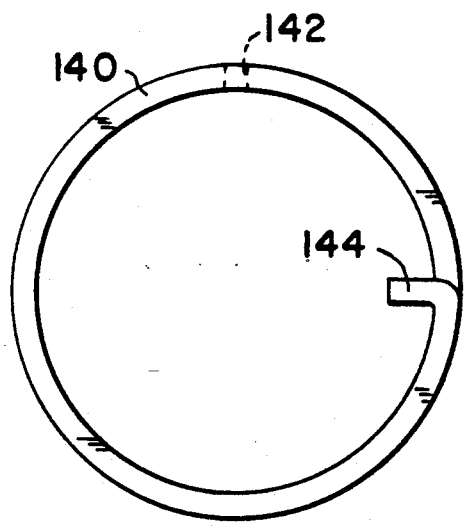
FIG. 6 is an elevational view taken along the line 6—6 in FIG. 5.

A helical spring 140 extends annularly around chuck 10 inside front sleeve 110 (see also FIGS. 5 and 6). One end 142 of spring 140 is attached to cam ring 80 (i.e., by being bent and fitted into one of notches 84 in the cam ring). The other end 144 of spring 140 is attached to nut 50 (i.e., by again being bent and fitted into an axial slot 54 in an annular collar which extends forwardly from the main portion of nut 50). An intermediate portion of bent end 142 bears on one side of one of the tabs 74 which extend radially outward from cage 70 in such a way as to urge cage 70 to rotate to the position in which each of balls 60 is in the most recessed end of the associated cam surface portion 82a when spring 140 is substantially unstressed. In the absence of any substantial resistance to motion of jaws 40 (e.g., before jaws 40 contact a tool), spring 140 transmits the rotation of sleeve 110 and cam ring 80 to nut 50, thereby rotating nut 50 and extending or retracting jaws 40, depending on the direction of rotation of sleeve 110. This occurs without substantial circumferential strain of spring 140. (The absence of circumferential strain in spring 140 means that bent ends 142 and 144 remain at substantially the same angular positions relative to one another.) Elements 60 and 70 rotate together with elements 50 and 80. Balls 90 rotate between elements 80 and 100.

When jaws 40 contact a tool, the force required to rotate nut 50 increases and nut 50 stops rotating. However, the user can continue to rotate sleeve 110. The circumferential length of spring 140 changes to allow the continued rotation of sleeve 110 and cam ring 80 even though nut 50 is no longer rotating. In other words, the angular location of bent end 142 changes relative to the angular location of bent end 144. Balls 60 move counterclockwise up initial cam surface portions 82a at half the speed of rotation of cam ring 80 relative to nut 50. Cam ring 80 carries the portion of bent end 142 which normally contacts one of tabs 74 away from that tab so that cage 70 is free to rotate (in response to the motion of balls 60) at half the rotational speed of cam ring 80. Because balls 60 are travelling from the more recessed ends of cam surface portions 82a to the less recessed parts of those cam surface portions, balls 60 force nut 50 and jaws 40 to move axially forward, thereby strengthening the grip of the jaws on the tool. At the very end of cam surface portions 82a, a final increment of rotation of sleeve 110 and cam ring 80 causes balls 60 to roll down into final cam surface portions 82b where the reverse inclination of the cam surfaces tends to hold the balls against rotation back in the chuck-loosening direction. Entry of balls 60 into final cam surface portions 82b can be felt and/or heard by the user to indicate to the user that the chuck is fully tightened and effectively locked on the tool.

To release the tool from chuck 10, sleeve 110 is rotated relative to sleeve 130 in the opposite direction from that associated with gripping a tool. This causes balls 60 to roll up out of final cam surface portions 82b and down initial cam surface portions 82a to the most recessed starting end of portions 82a. Spring 140 returns to its initial circumferential length during this motion of sleeve 110 and cam ring 80 relative to nut 50. Spring 140 again contacts one of tabs 74 to ensure that cage 70 and balls 60 return to their initial positions relative to cam ring 80. The movement of balls 60 back toward the more recessed ends of cam surfaces 82 relieves the final clamping pressure of jaws 40 on the tool. Thereafter, continued rotation of sleeve 110 and cam ring 80 in the chuck-loosening direction is transmitted to nut 50 by spring 140. This causes nut 50 to rotate and retract jaws 40 from the tool.

Because the final tightening of chuck 10 is provided without rotation of nut 50, the threads between jaws 40 and nut 50 can be relatively coarse. This is desirable because it produces relatively rapid motion of the jaws in response to rotation of sleeve 110. It is not necessary to use relatively fine threads to enhance the tool-gripping effectiveness of the chuck. The user need only operate one control (i.e., sleeve 110) to preform all chuck-adjusting, tool-gripping, tool-locking, tool-unlocking, and tool-releasing functions of the chuck. The chuck automatically switches from initial tightening mode (in which nut 50 rotates) to final tightening mode (in which nut 50 does not rotate and in which balls 60 become operative to cam nut 50 axially forward). When the chuck is loosened, spring 140 acts positively on cage 70 to restore balls 60 to their initial position.

It will be understood that the foregoing is merely illustrative of the principles of this invention and that various modifications can be made by those skilled in the art without departing from the scope and spirit of the invention. For example, helical spring 140 can be wound in either direction around chuck 10 so that it either pushes or pulls nut 50 with sleeve 110 during tightening of the chuck. (If spring 140 pushes nut 50 during tightening, it will pull the nut during loosening. If spring 140 pulls nut 50 during tightening, it will push the nut during loosening.) As another example of a modification within the scope of this invention, any other type of circumferentially acting spring could be used in place of helical spring 140 if desired. For example, one or more leaf springs could extend axially between elements 50 and 110. Alternatively, accordion or coil springs could extend circumferentially between elements 50 and 110. Further examples of possible modifications within the scope of this invention include substitution of other kinds of bearings such as rollers for balls 60 and/or 90, use of other types of cams such as simple ramps without balls, placement of cam surfaces like 82 on nut 50 instead of on ring 80, use of a member other than spring 140 (e.g., a finger projecting forwardly from cam ring 80) to contact one of tabs 74 in order to ensure resetting of elements 60 and 70, etc. The invention is also fully applicable to chucks of very different basic constructions (e.g., chucks in which the jaws are unthreaded and are advanced or retracted by an advancing or retracting member which is coupled to the jaws by means other than threads).

The invention claimed is:

1. A chuck for releasably gripping a tool concentric with a longitudinal axis of said chuck comprising:
   a plurality of jaws circumferentially spaced from one another concentrically around said longitudinal axis and mounted for movement toward and away from one another in order to grip or release said tool;
   first means for engaging said jaws to cause said jaws to move toward or away from one another as a result of rotation of at least a rotatable part of said first means about said longitudinal axis and also as a result of reciprocation of at least a reciprocable part of said first means parallel to said longitudinal axis;
   second means mounted for rotation relative to at least said rotatable part of said first means about said longitudinal axis;
   spring means acting in a direction circumferentially around said longitudinal axis for resiliently urging said rotatable part of said first means to rotate with said second means, said spring means allowing said second means to rotate relative to said rotatable part of said first means when rotation of said rotatable part is impeded by contact between said jaws and said tool; and
   cam means acting between said second means and said reciprocable part of said first means for reciprocating said reciprocable part in response to rotation of said second means relative to said rotatable part of said first means.

2. The chuck defined in claim 1 wherein said spring means comprises a helical spring substantially concentric with said longitudinal axis, one end of said helical spring being attached to said rotatable part of said first means, and the other end of said spring being attached to said second means.

3. The chuck defined in claim 1 wherein said cam means comprises:
   a cam surface extending in a circumferential direction concentric with said longitudinal axis; and
   a cam follower member in contact with said cam surface for following said cam surface when said second means rotates relative to the rotatable part of said first means.

4. The chuck defined in claim 3 wherein said cam follower member is a ball.

5. The chuck defined in claim 1 further comprising:
   means for restoring said cam means to an initial condition whenever rotation of said rotatable part of said first means is not impeded by contact between said jaws and said tool.

6. The chuck defined in claim 1 wherein said cam means comprises:
   a first portion which causes said jaws to tighten on said tool immediately after rotation of said rotatable part of said first means is first impeded by contact between said jaws and said tool during operation of said chuck to grip said tool; and
   a second portion which is operative after said first portion to cause said jaws to untighten on said tool by an amount substantially less than the tightening produced by said first portion.

7. A chuck for releasably gripping a tool concentric with a longitudinal axis of said chuck comprising:
   a body;
   a plurality of jaws disposed in said body, said jaws being circumferentially spaced from one another around said longitudinal axis and movable relative to said body toward and away from one another to grip or release said tool, each of said jaws having a threaded portion;
   a nut mounted on said body concentric with said longitudinal axis, said nut being rotatable relative to said body about said longitudinal axis and threadedly engaged with the threaded portions of said jaws for moving said jaws toward or away from one another as a result of rotation of said nut relative to said body and also as a result of reciprocation of said nut relative to said body parallel to said longitudinal axis;
   a sleeve mounted on said body for rotation relative to said body concentric with said longitudinal axis;
   a spring operatively connected between said sleeve and said nut for resiliently urging said nut to rotate with said sleeve, said spring allowing said sleeve to rotate relative to said nut when rotation of said nut is impeded by contact between said jaws and said tool; and
   cam means operatively connected between said sleeve and said nut for causing said nut to reciprocate relative to said body parallel to said longitudinal axis when said sleeve rotates relative to said nut.

8. The chuck defined in claim 7 wherein said spring is a helical spring concentric with said longitudinal axis, and wherein one end of said spring is connected to said nut and the other end of said spring is connected to said sleeve.

9. The chuck defined in claim 7 wherein said cam means comprises:
   a plurality of arcuate cam surfaces circumferentially spaced from one another concentric with said longitudinal axis; and
   a plurality of cam follower members, each of which contacts and follows a respective one of said cam surfaces.

10. The chuck defined in claim 9 wherein each of said cam follower members comprises a ball.

11. The chuck defined in claim 10 wherein said balls are disposed in circumferentially spaced apertures in an annular member which is concentric with said longitudinal axis and rotatable relative to said sleeve about said longitudinal axis.

12. The chuck defined in claim 11 further comprising: means for rotating said annular member to an initial position whenever rotation of said nut is not impeded by contact between said jaws and said tool.

13. The chuck defined in claim 7 wherein said cam means includes an initial portion which causes said nut to reciprocate in the direction which tightens said jaws on said tool, and a final portion which causes said nut to reciprocate in the direction which untightens said jaws on said tool, the amount of reciprocation produced by said final portion being substantially less than the amount of reciprocation produced by said initial portion.

14. The chuck defined in claim 9 wherein said cam surfaces are disposed on said sleeve, and wherein said cam follower members are disposed between said cam surfaces and said nut.

15. The chuck defined in claim 12 wherein said means for rotating said annular member comprises a portion of said spring which releasably contacts said annular member.

* * * * *